(12) United States Patent
Johnson

(10) Patent No.: US 6,681,714 B1
(45) Date of Patent: Jan. 27, 2004

(54) METHOD FOR CHASING ANIMALS FROM A LOCATION

(76) Inventor: Richard Robert Johnson, 932 S. Waiola Ave., LaGrange, IL (US) 60525

( * ) Notice: Subject to any disclaimer, the term of this patent is extended or adjusted under 35 U.S.C. 154(b) by 271 days.

(21) Appl. No.: 09/675,626

(22) Filed: Sep. 29, 2000

Related U.S. Application Data

(60) Provisional application No. 60/168,461, filed on Dec. 2, 1999.

(51) Int. Cl.$^7$ .................................................. G08B 9/00
(52) U.S. Cl. .................. 116/22 A; 119/713; 340/573.2
(58) Field of Search .................. 119/713, 720, 119/721; 116/22 A, 202; 52/101; 340/573.2

(56) References Cited

U.S. PATENT DOCUMENTS

| | | | |
|---|---|---|---|
| 3,825,916 A | | 7/1974 | Steele et al. |
| 3,898,639 A | | 8/1975 | Muncheryan |
| 5,299,971 A | * | 4/1994 | Hart ........................... 446/484 |
| 5,335,626 A | * | 8/1994 | Calabrese ................... 119/721 |
| 5,450,063 A | * | 9/1995 | Peterson et al. ......... 340/573.2 |
| 5,515,026 A | * | 5/1996 | Ewert ........................... 340/436 |
| 5,685,636 A | * | 11/1997 | German ....................... 362/259 |
| 5,892,446 A | * | 4/1999 | Reich ....................... 340/573.1 |
| 5,969,593 A | * | 10/1999 | Will ......................... 340/384.2 |
| 5,986,551 A | * | 11/1999 | Pueyo et al. ............ 340/573.1 |
| 6,007,218 A | * | 12/1999 | German et al. ............. 362/259 |
| 6,069,748 A | * | 5/2000 | Bietry ......................... 359/719 |
| 6,250,255 B1 | * | 6/2001 | Lenhardt et al. ............ 119/713 |
| 6,288,644 B1 | * | 9/2001 | Mathews et al. ........... 340/555 |
| 6,309,090 B1 | * | 10/2001 | Tukin ......................... 362/276 |
| 6,407,670 B1 | * | 6/2002 | Dysarsz et al. .......... 340/573.2 |
| 6,575,597 B1 | * | 6/2003 | Cramer et al. .............. 362/259 |

FOREIGN PATENT DOCUMENTS

| | | | |
|---|---|---|---|
| FR | 2227993 A | * | 1/1975 |
| FR | 2676618 A1 | * | 11/1992 |
| JP | 2002000162 A | * | 1/2002 |

* cited by examiner

*Primary Examiner*—Charles T. Jordan
*Assistant Examiner*—John W. Zerr
(74) *Attorney, Agent, or Firm*—Cherskov & Flaynik

(57) ABSTRACT

This invention provides for a method of keeping animals away from a location comprising subjecting the location to a light beam or subjecting the animals to the light beam. Also provided for is a method for disturbing the nocturnal nesting areas of water fowl by subjecting those nocturnal nesting areas to a light beam.

19 Claims, 3 Drawing Sheets

METHOD FOR CHASING ANIMALS FROM A LOCATION

This application claims the benefit of Provisional application Ser. No. 60/168,461, filed Dec. 2, 1999.

BACKGROUND OF THE INVENTION

1. Field of the Invention

This invention relates to a method for chasing animals from a location, and more particularly this invention relates to a method for using a light beam device to chase geese away from bodies of water.

2. Background of the Invention

Preventing animals from consuming gardens, athletic fields, playgrounds, golf courses, and parks has long been troublesome to owners of these properties and for the public frequenting these properties. Not only are these properties aesthetically diminished by the consumption of grass and the presence of animal droppings, the problem also poses a human health risk. Particularly with the presence of geese, this problem has persevered, in large part, due to the fact that many of these properties feature lakes, ponds, or other small bodies of water in which geese tend to congregate geese, the problem has been further compounded. While human presence serves as a partial deterrent, their absence overnight in these locations allows the geese to loiter and feed at leisure.

Many presently available goose deterrent systems comprise altering the habitats of these locations to offend the senses of the geese. Examples of typical methods include reducing grassy areas, using shrubbery and foliage to cordon off water bodies, installing fences, utilizing noise makers to scare the geese away, and flavoring the grass with distasteful substances.

Many of the above recited solutions are impractical for the target locations. For example, reducing grassy areas and surrounding water hazards with shrubbery is inconsistent with the purpose of a golf course or athletic field. Utilizing noise makers such as cap guns or the discharge of blank shells necessarily upsets the serenity of these locations for humans as well as geese.

A myriad of noninvasive devices exist to deter animal presence. In one instance (U.S. Pat. No. 5,299,971), a relatively complex interactive tracking device first locates an intruder and then flashes a bright laser beam on same.

U.S. Pat. Nos. 3,825,916 and 3,898,639 rely on the interruption of a laser beam to trip a circuit for follow-up by secondary monitoring systems or personnel.

The use of lasers to deter water fowl presence has not been attempted. In fact, U.S. Pat. No. 5,986,551 teaches away from such a method.

A need exists in the art for a method to chase animals from a specific location. The method should be non-invasive and non-intrusive. The method also should utilize off-the-shelf componentry or technology and be easy to maintain.

SUMMARY OF THE INVENTION

It is an object of the present invention to provide a method for chasing animals away from a location that overcomes many of the disadvantages in the prior art.

Another object of the present invention is to provide a method for chasing animals away from specific locations. A feature of this invention is the use of a light beam to deter the presence of the animals. An advantage of this invention is that the animals are not harmed and the location is not adulterated.

Still another object of the present invention is to provide a method for chasing water fowl away from water bodies and surrounding shore areas. A feature of this invention is the use of a light beam source situated at the water's edge. An advantage of this invention is that minimal human labor or maintenance are required. Another advantage is that a land-based power source can be utilized to energize the light beam.

An additional object of the present invention is to provide a method for chasing a specific animal cohort away from specific regions. A feature of this invention is that a light beam swath illuminates animals present in the region. An advantage of this invention is that only animals within the controlled light beam swath are disturbed, while the surrounding ecosystem is unaffected.

Another object of the present invention is to provide a method for disturbing nocturnal nesting areas of water foul. A feature of this invention is subjecting the nocturnal nesting areas of water foul to a light beam. An advantage of this invention is that the water fowl no longer nest in the area subjected to the light beam.

Briefly, this invention provides a method for keeping animals away from a location, comprising subjecting the location to a light beam.

This invention also provides a method for keeping animals from a location, comprising subjecting the animals to a light beam.

The invention further provides a method for keeping animals from a location, comprising causing a light beam to be viewed by the animals.

The invention also provides a method for disturbing nocturnal nesting areas of water fowl, said method comprising selecting a nocturnal nesting area and subjecting said nocturnal nesting area to a light beam.

BRIEF DESCRIPTION OF THE DRAWING

Other objects, features, and advantages of the present invention will become apparent from the following description and the accompanying drawings, wherein.

DETAILED DESCRIPTION OF THE INVENTION

The invention provides a method for deterring animal presence at specific locations. The method is suitable at any elevation and at any temperature.

A salient feature of the invention is the use of a light beam to frighten animals away from a location. A variety of light sources can be used to effect this method. However, the remainder of this Detailed Description section features the use of laser beams in the invented method, mainly for illustrative purposes.

Generally, a laser source affixed to a specific location emits a laser swath defined by a set angle. Animals traversing the region covered by this swath are offended by the laser and flee the region. The inventor believes that the mere appearance of the laser light on the animals themselves and on adjacent animals and structures frightens them away.

The animals can detect the light in a variety of ways. For example, direct visual detection (dazzling) of the light startles the animal. Alternatively, visible light reflected off of the body of the animal is detected by the animal and startles same. Likewise, the animals visually detect this visible light on the bodies of their cohorts, and are startled. Additionally, the thermal energy conferred by the light may be physically detected by the animal, and consequently drives the animals from the location.

Figure 1:
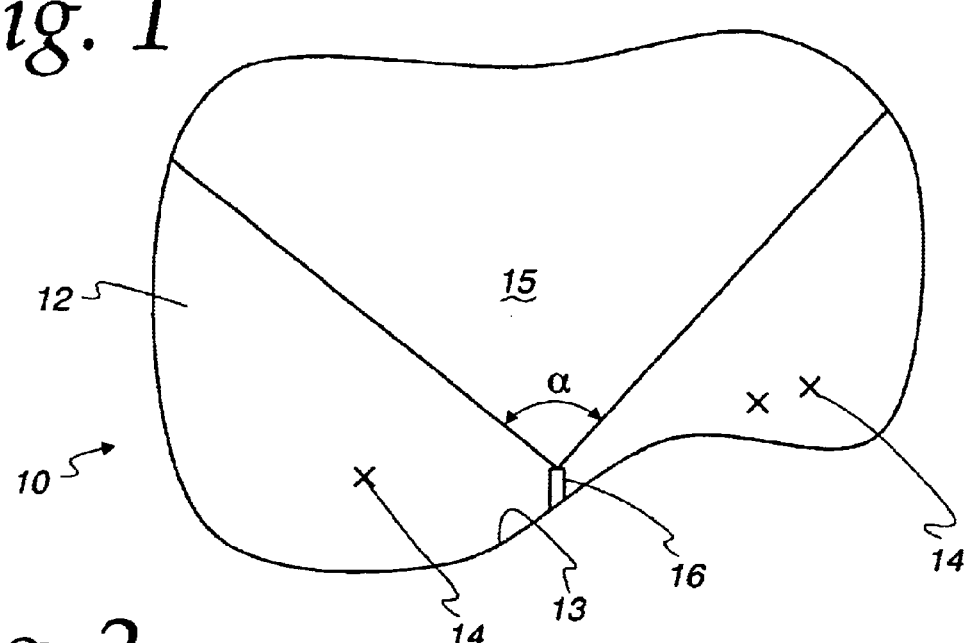
FIG. 1 is an aerial view of the invented method.

FIG. 1 depicts an aerial view of the method 10 in use for a selected area such as a lake 12. The area may be contained within a larger geographic region, such as a golf course. In this depiction, a laser beam source 16 is fixed to a predetermined location along the water's edge 13. The swath created by the laser is defined by the angle a. Water fowl 14 are frightened away by the laser beam. Very few, if any, water fowl even remain outside the swath of the laser beam. In fact, inventor experience has shown that where the fowl are prevented from nesting on a portion of the water body, no nesting or congregating occurs anywhere on the water body.

While the foregoing illustrates the preferred embodiment of this invention, the invention is not relegated to water as the target location of the laser beam swath.

Figure 2:
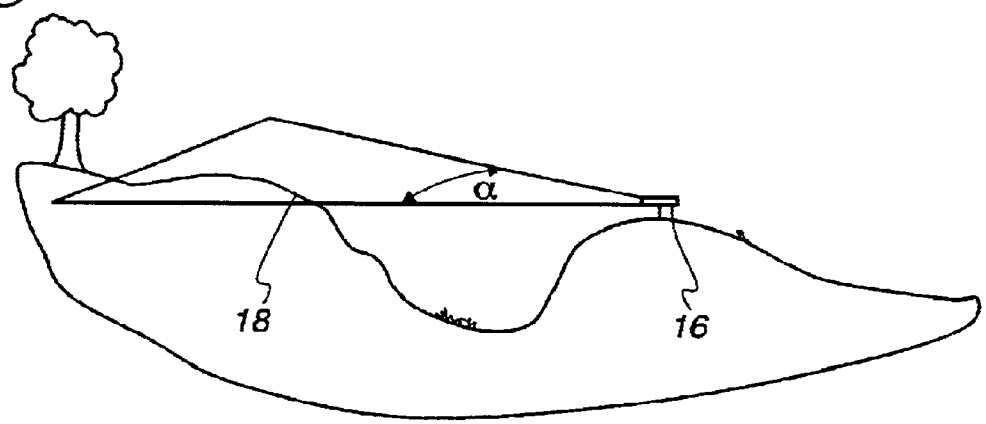
FIG. 2 is the side view of an embodiment of the invented method wherein the target surface is not level with the light beam source.

FIG. 2 is a side view of an embodiment of the invented method in use wherein the target surface is not level with the laser beam source. The laser beam source 16 is positioned to emit a laser swath with angle a at any designated level. The target surface terrain 18 varies in elevation.

Figure 3:
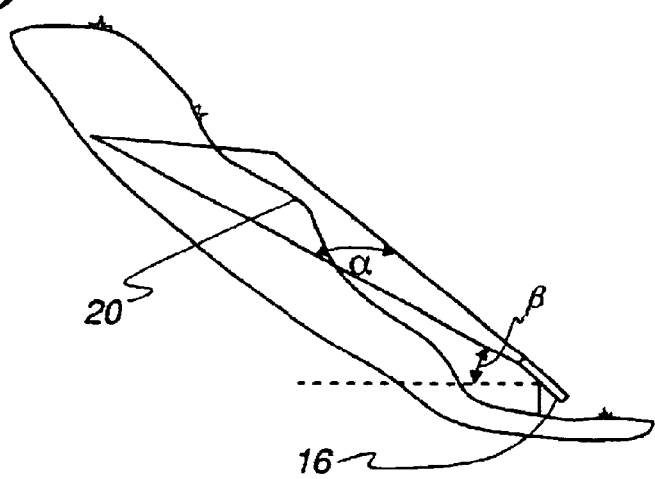
FIG. 3 is the side view of an embodiment of the invention wherein the target surface is an incline.

FIG. 3 is a side view of an embodiment wherein the target surface 20 is inclined and uneven. As described supra, the laser swath defines an angle a to cover the area to be protected. Also, and depending on the size of the animal intruder, the laser swath is placed at a certain pitch β relative to its support surface to bathe or "cover" the subject area with focused light at a certain height above the ground surface.

Light Source Detail

A myriad of concentrated light beams are suitable for use in the invented method. However, any light source utilized must render a light beam that is visible to the unaided human eye at the desired distance from the light source. The desired distance will be determined by the shape and size of the geological area to be protected. Ambient light levels also will play a role in determining suitable light sources. Generally, lasers will be utilized when the method is used to protect far-reaching expanses of geography, or when high ambient light conditions exist. In low light situations, i.e., at night, a number of light sources are available, including but not limited to lasers, fresnel lenses, spotlights, and strobe lights. Generally, any suitable light beam has a wavelength of between 4,000 and 7,500 Angstroms.

The inventor utilized a laser beam to prevent water fowl from gathering on certain water bodies. In one configuration the laser source is mounted along the water's edge. The source is positioned between approximately 8 and 24 inches above the water's surface 15 so as to effect a laser swath parallel with the water surface.

To conserve power, the laser beam source is fitted with a light sensitive switch which turns the laser off in high-light conditions. When the laser is powered up, a horizontal laser beam swath is created. As geese and other target cohorts swim within that swath, they are painted with a thin red line created by the laser beam. As the animals move, this line wiggles across their bodies and frightens them, causing the animals to move out of the area defined by the swath. With a 3 milliWatt laser, this "paint" effect frightens animals for distances of up to 50 m. For distances beyond 50 m, laser light reaching the eye dazzles the viewer. Birds are frightened away when they are so dazzled and the inventor has observed that birds were so frightened at distances of 200 m over land and of 400 m over the surface of a body of water.

Figure 4:
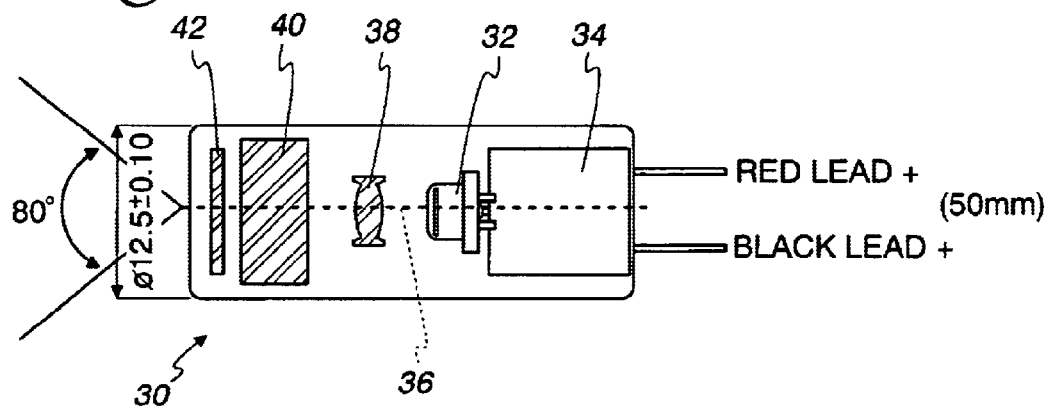
FIG. 4 is a schematic of laser circuitry utilized in the invented method.

Any FDA approved laser can be incorporated in this pest deterrence method. Generally an exemplary laser module is illustrated as numeral 30 in FIG. 4. A laser diode 32 is generally powered by a power supply 34 within an operating voltage of between 2 and 6 V.

A laser beam 36 resulting therefrom is perpendicularly incident to a collimating lens 38, the collimating lens necessary to produce a parallel light beam. Typically, the collimating lens is aspherical plastic. The collimating lens is positioned intermediate the diode 32 and a quartz cylindric lens 40. It is the cylindric lens which generates a line or swath having an effective angle of coverage of approximately 90°.

The cylindric lens 40 is intermediate the collimating lens 38 and a protective window lens 42. This window lens provides protection to the internal units of the laser module. The window lens is typically comprised of a flat substrate transparent to the laser light. A myriad of commercially available lasers are suit units are suitable for use with the invented method including those of the VLM 650 series, manufactured by Quarton, Inc., of San Antonio Tex. The wavelength of these units, approximately 645–665 nm, is suitable for this invented method. Also, all of the above listed optical components and the laser diode can be obtained commercially from a myriad of manufacturers.

As noted supra, in one application of the method, lasers used to keep water fowl away from water bodies should be mounted parallel to the surface of the water to maintain a horizontal laser beam swath. As such, the laser module is used in conjunction with a means for leveling the laser swath. A commercially available laser integral is "THE LASER EDGE" manufactured by Quarton, Inc. of San Antonio, Tex. This integrated laser provides a means for leveling the laser beam swath, and is particularly suited to deter animals from congregating. The intensity L of this laser beam source is less than 5 mW and most often only 3 mW. This enables humans and animals to view the laser beam without sustaining eye damage. The swath produced by the laser beam has an effective angular breadth a of approximately 90° and a thickness t that varies linearly with distance from approximately 28 mm at 50 m from the laser to 108 mm at 200 m and 215 mm (estimated) at 400 m.

Flux varies inversely with the distance. With L measured in Wafts, a in degrees and r and t in meters, $$F = \frac{360 \, L}{r \alpha t \cdot 2_\pi} W/m^2$$

Figure 6:
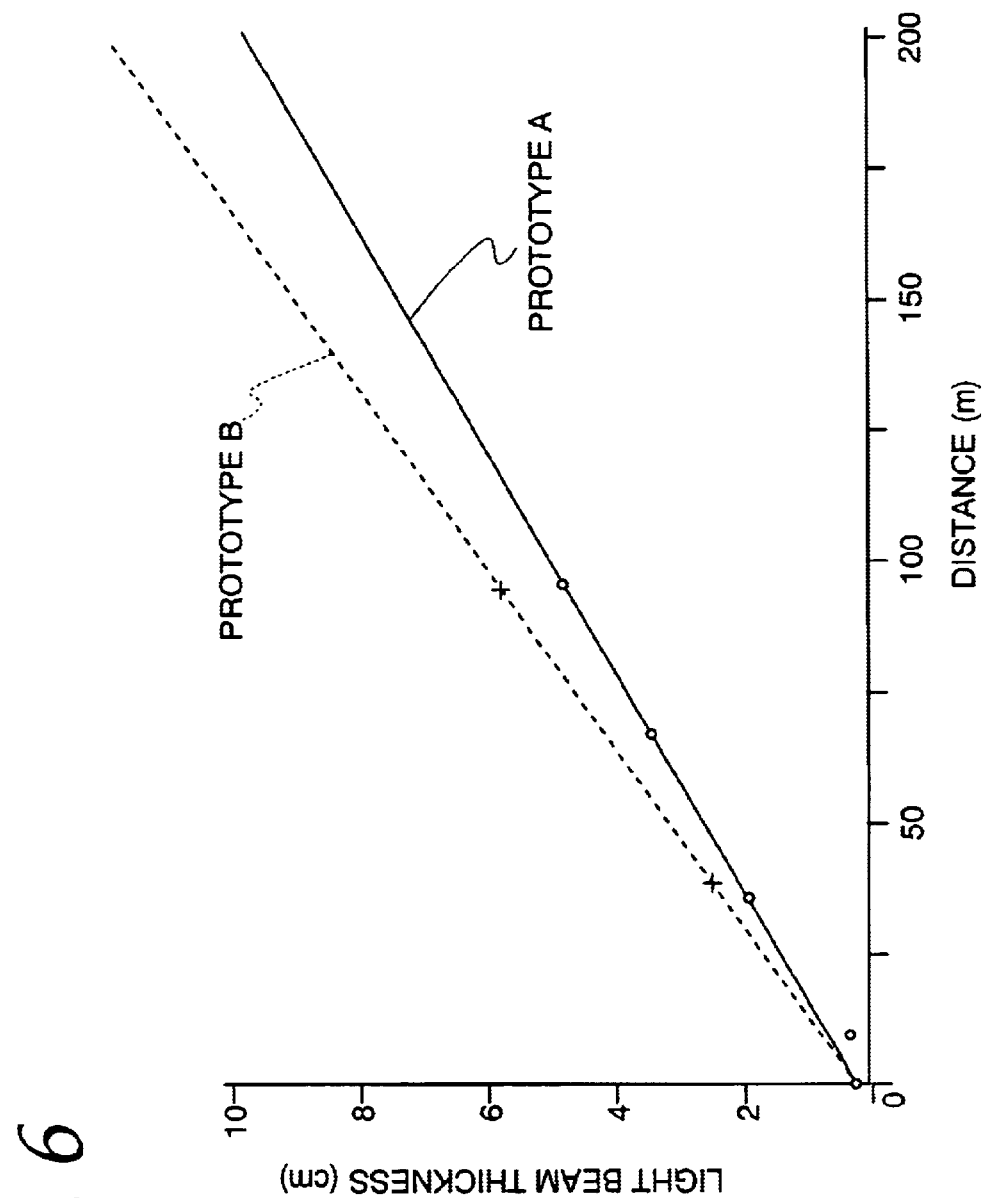
FIG. 6 is a plot of measured beam thickness versus distance for two prototypes of the present invention.

Measurements performed by the inventor with two different lasers show that t increases linearly with distance from approximately 28 mm at 50 meters to 108 mm at 200 m. At any distance, fluxes of between approximately 20 $\mu W/m^2$ and 1500 $\mu W/m^2$ at the animal's location produces adequate agitation to the target cohort. See FIG. 6 where the measured thickness of the light beam is plotted versus distance from the light source for two different laser prototypes. On this basis, applicant extrapolates a value of 200 mm for t at a distance of 400 m. With L =3 mW, the above formula yields the following fluxes:

| Distance (m) | Flux ($\mu W/m^2$) |
|---|---|
| 50 | 1,300 |
| 200 | 90 |
| 400 | 23 |

Note that at a distance of 50 meters, the flux is only 1.3 mW/M$^2$. The inventor's measurements have demonstrated that the above fluxes are sufficient to startle an animal at distances of over 200 m over land and over 400 m over the surface of a lake.

The device is powered with three D-size batteries and rechargeable solar cells. Generally, light beam leveling is not required to protect a specific area. For instance, instead of leveling the device parallel to a flat surface, such as a water surface, the device merely would be pointed at a predetermined target location. Such a scenario is depicted in FIGS. 2 and 3.

As noted supra, the power source for the laser beam source can be either self-contained by using batteries or solar panels, or remotely connected to the laser beam source. This enhances the utility of the invented method in that the laser beam source can be highly portable or permanently fixed to one location.

Figure 5:
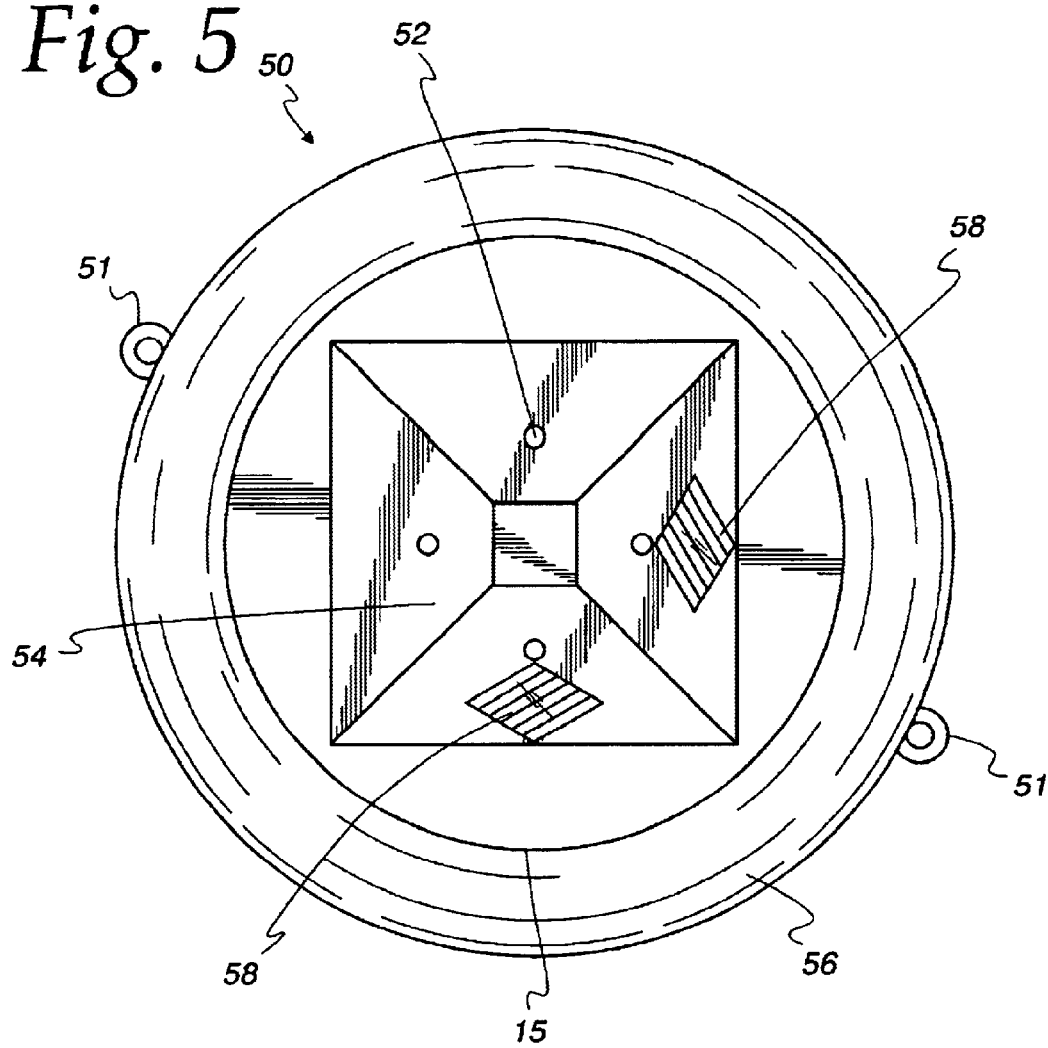
FIG. 5 is an aerial perspective view of a multi-laser device to provide a 360 degree laser swath, in accordance with features of the present invention.

For example, aside from situating the laser source at the edge of a water body, the invention also provides for a plurality of lasers situated at the center of a water body so as to provide a laser swath or a plurality of laser swaths to simultaneously blanket all portions of a water surface defining the water body. FIG. 5 is an aerial perspective view of an embodiment 50 of the invented method wherein a plurality of laser beams 52 are utilized by affixing them to each side of a housing 54. The housing 54 is adapted to float on the water body. One means for floatation is removably affixing the housing 54 to a floating substrate 56 which in turn contacts the water. A myriad of means for affixing the housing to the floating substrate are suitable, including, but not limited to, frictional interaction between certain regions of a exterior surfaces of the housing and the substrate, snap-fit arrangements, standard nut-bolt configurations, hook-and-pile configurations, and even integrally molding floatable material to the housing material.

When four laser beams, each beam having a 90° swath is utilized, the combined swath angle is enlarged to 360°. As such, simultaneous coverage of an entire area is provided.

A myriad of power configurations are suitable for the floating laser unit. For example, solar panels 58 affixed to the housing 54 obviate the need for an external or finite power source. Alternatively, or in combination with the solar panels, light weight batteries contained in the housing are utilized to store surplus energy generated from the panels, or in instances were the batteries are recharged during the day in anticipation of all-night use.

One or a plurality of mooring-line anchor points 51 are utilized in conjunction with flexible lines (not shown) to move the floating unit to desired portions of the water surface 15 or to retrieve the unit for servicing.

EXAMPLES

In tests conducted by the inventor, the invented method provided results equal to or superior to certain state-of-the art methods. The invented method was used at multiple locations at Butler National Golf Club, (Oakbrook, Ill.), and Butterfield Country Club Irrigation Lake (Oakbrook, Ill.). Vast decreases in goose populations and goose droppings were observed. When application of the invented method was terminated, goose populations returned to their prior unfavorable levels.

Specifically, on Nov. 16, 1999 geese were observed at the Butterfield Country Club Irrigation Lake. The laser beam source was placed 4 feet above the surface of the body of water. Geese were still observed. However, when the laser beam source was placed at the water's edge, between approximately 8 and 24 inches above the surface of the water body, the geese fled the water body and did not return.

As a further example, on Nov. 2, 1999, 40 geese were present at the 15$^{th}$ Green at Butler National Golf Club. The laser beam source was then affixed and the invented method was executed. The following day, no geese were observed at the location. Furthermore, no geese were observed on both of the following days.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for chasing animals away from a surface the animals are traversing, the method comprising subjecting the surface to a fixed laser beam having a wavelength selected from between approximately 4.000 and 7.500 Angstroms and wherein the laser beam is positioned between approximately 8 and 24 inches above the surface so as to effect a laser swath parallel with the surface.

2. The method as recited in claim 1, wherein the surface is defined by a body of water.

3. The method as recited in claim 1, wherein the laser beam has a wavelength selected from between approximately 6450 and 6650 Angstroms.

4. The method as recited in claim 1, wherein the laser beam has an intensity of at least 20 $\mu W/cm^2$ at 400 meters from a light beam source.

5. The method as recited in claim 1, wherein the laser beam is emitted with a swath of approximately 90°.

6. The method as recited in claim 1, wherein the surface is subjected to a plurality of laser beams.

7. The method as recited in claim 1, wherein the animals are water fowl, the surface is the surface of a water body, and the water fowl are swimming on the surface.

8. A method for keeping animals from a surface, comprising subjecting the animals to a fixed visible laser beam swath positioned between approximately 8 and 24 inches above the surface so that the swath is parallel with the surface.

9. The method as recited in claim 8, wherein the surface is defined by a body of water.

10. The method as recited in claim 8, wherein the laser beam swath has an intensity of at least 20 $\mu W/cm^2$ where the animals are located.

11. The method as recited in claim 8, wherein the laser beam swath spans approximately 90°.

12. The method as recited in claim 8 wherein the animals are located within the laser beam swath.

13. The method as recited in claim 8, wherein the laser beam swath is visible by the animals.

14. A method for disturbing nocturnal nesting areas of waterfowl, said method comprising:

a) selecting a nocturnal nesting area; and b) subjecting said nocturnal nesting area to a single-wavelength laser beam swath wherein the laser beam is positioned between approximately 8 and 24 inches above a water surface near the nesting area so as to effect a laser swath parallel with the nesting area.

15. The method as recited in claim 14, wherein the laser beam swath has a wavelength of between approximately 4,000 and 7,000 Angstroms.

16. The method as recited in claim 14, wherein the laser beam swath has an intensity of at least 20 $\mu$W/cm$^2$ at 400 meters from a light.

17. The method as recited in claim 14, wherein the laser beam swath is emitted within an angle of approximately 90°.

18. The method as recited in claim 14, wherein the laser beam swath is activated at dusk.

19. The method as recited in claim 14, wherein the laser beam swath is emitted from a fixed source.

* * * * *